United States Patent
Horn et al.

(10) Patent No.: US 6,290,210 B1
(45) Date of Patent: Sep. 18, 2001

(54) CLAMPING AND LIFTING MECHANISM

(75) Inventors: Edward R. Horn, Oconomowoc; Vladimir S. Novak, Appleton; Robert E. Dowd, Oconomowoc, all of WI (US); Leonoid Dukhin, *deceased*, late of Miami Beach, FL (US), by Rakhil Dukhin, legal representative (73) Assignee: Aladdin Engineering & Manufacturing, Waukesha, WI (US)

( * ) Notice: Subject to any disclaimer, the term of this patent is extended or adjusted under 35 U.S.C. 154(b) by 0 days.

(21) Appl. No.: 09/323,630

(22) Filed: Jun. 1, 1999

(Under 37 CFR 1.47)

(51) Int. Cl.$^7$ ....................................................... B23Q 3/08
(52) U.S. Cl. ................................................................ 254/34
(58) Field of Search ........................ 294/88, 115; 269/32, 269/34; 254/18

(56) References Cited

U.S. PATENT DOCUMENTS

| 1,771,712 | * | 7/1930 | Jimerson ................................. 254/18 |
| 2,439,483 | | 4/1948 | Merriman . | |

(List continued on next page.)

OTHER PUBLICATIONS

The World of Clamping Booklet by De–Sta–Co, Divison of Dover Corporation, 1984.

*Primary Examiner*—Robert C. Watson
(74) *Attorney, Agent, or Firm*—Michael Best & Friedrich LLP (57) ABSTRACT

A clamp for clampingly engaging a portion of a workpiece and for lifting the workpiece from a work surface. The clamp comprises a fluid actuated pistol and cylinder assembly, a frame assembly, first and second clamp arms supported by said frame assembly for pivotal movement about respective first and second pivot axes and axial movement parallel to said longitudinal axis between an unclamped position and a clamped and lifted position, first and second pivot pins respectively defining said first and second pivot axes, first and second slider members respectively supported in first and second tracks for axial movement relative to frame assembly and respectively supporting said first and second pivot pins for axial movement along said first and second tracks relative to said frame assembly, first and second link pins supported proximate the opposite ends of said first and second clamp arms, respectively, said first link pin being movable along said first arcuate track and said first track and said second link pin being movable along said second arcuate track and said second track, first and second link members connecting said first and second link pins, respectively, to the piston such that movement of piston between said extended position and said retracted position causes movement of said first and second clamp arms between the unclamped position and the clamped and lifted position. As the piston is moved from the extended position to an intermediate position, the clamp arms are pivoted to a clamped position. As the piston is moved from the intermediate position to the retracted position, the clamp arms are moved to the clamped and lifted position and the slider members are moved in the tracks, respectively, so that said arcuate portions are substantially misaligned with said arcuate tracks to prevent the clamp arms from moving to an unclamped position.

31 Claims, 5 Drawing Sheets

U.S. PATENT DOCUMENTS

| | | |
|---|---|---|
| 2,815,052 | 12/1957 | Krasnow . |
| 2,908,205 | 10/1959 | Furman et al. . |
| 2,972,476 | 2/1961 | Blatt . |
| 3,108,794 | 10/1963 | Blatt . |
| 3,273,878 | 9/1966 | Blatt . |
| 3,302,943 | 2/1967 | Mericle, Jr. . |
| 3,362,703 | 1/1968 | Blatt . |
| 3,371,923 | 3/1968 | Blatt . |
| 3,371,953 | 3/1968 | Blatt . |
| 3,381,954 | 5/1968 | Blatt . |
| 3,482,830 | 12/1969 | Sendoykas . |
| 3,482,831 | 12/1969 | Blatt . |
| 3,545,050 | 12/1970 | Blatt et al. . |
| 3,570,835 | 3/1971 | McPherson . |
| 3,618,931 | 11/1971 | Blatt . |
| 3,702,185 | 11/1972 | Blatt . |
| 4,021,027 | 5/1977 | Blatt . |
| 4,240,620 | 12/1980 | Tunkers . |
| 4,449,745 | 5/1984 | Blatt . |
| 4,576,367 | 3/1986 | Horn et al. . |
| 4,596,415 | 6/1986 | Blatt . |
| 4,679,782 | 7/1987 | Horn et al. . |
| 5,072,652 | 12/1991 | Blatt . |

\* cited by examiner

Fig. 6

Fig. 7

CLAMPING AND LIFTING MECHANISM

FIELD OF THE INVENTION

The invention relates to clamping and gripping devices and, more particularly, to a mechanism for clamping a workpiece and lifting the workpiece from a work surface during a manufacturing operation.

BACKGROUND OF THE INVENTION

One type of conventional assembly for clamping a workpiece and lifting the workpiece from a work surface includes a clamping mechanism and a separate lifting mechanism. The clamping mechanism generally includes a pair of clamp arms pivotally supported by a frame. Each clamp arm has an end for engaging the workpiece and is supported by the frame for pivotal movement about a pivot axis. A drive mechanism, such as a pneumatically driven piston, is operatively connected to the clamp arms through a link assembly to cause pivotal movement of the clamp aims between a clamped position, in which the clamp alms clampingly engage the workpiece, and an unclamped position.

The separate lifting mechanism is provided to lift the clamping mechanism while the workpiece is clamped. The workpiece is thereby lifted from the work surface so that, for example, the workpiece can be moved to another work surface. The lifting mechanism is generally operable between a lifted position and a non-lifted position.

SUMMARY OF THE INVENTION

One problem with the above-described conventional clamping and lifting assembly is that the assembly includes a clamping mechanism and a separate lifting mechanism. As a result, the assembly requires separate components for the clamping mechanism and for the lifting mechanism. This increases the cost and complexity of the conventional clamping and lifting assembly.

Another problem with the conventional assembly is that separate controls are required for the clamping mechanism and for the lifting mechanism. This increases the complexity of the control system for the assembly.

Yet another problem with the conventional assembly is that, because separate controls arc provided for the clamping mechanism and the separate lifting mechanism, the control for the clamping mechanism may be accidentally operated so that the clamping mechanism moves to the unclamped condition while the lifting mechanism is still in the lifted condition, causing the lifted workpiece to be dropped.

A further problem with the conventional assembly is that, if fluid pressure is lost while the workpiece is clamped and lifted, the lifting mechanism may move to the unlifted condition and/or the clamping mechanism may move to the unclamped condition, causing the workpiece to be dropped.

The present invention provides an improved clamping and lifting mechanism that overcomes the problems of conventional clamping and lifting assemblies. The present invention provides a clamp combining clamping and lifting of a workpiece in a single mechanism. The clamping and the lifting of the workpiece are controlled by a single control assembly. This provides a simpler and less expensive mechanism.

Also, the present invention provides a clamp in which the workpiece cannot be accidentally unclamped while in a lifted position. Further, when the workpiece is clamped and lifted, the clamp is mechanically locked in this condition so that a loss of fluid pressure will not result in the workpiece being dropped and/or unclamped.

The present invention provides a clamp for clampingly engaging a portion of a workpiece and for lifting the workpiece from a work surface. The clamp comprises a frame assembly defining a longitudinal axis, an actuating assembly supported by the frame assembly and including a movable member, the actuating assembly preferably being a fluid actuated piston and cylinder assembly including a reciprocating piston having a projecting end movable between a retracted position and an extended position, and at least one clamp arm and, preferably, first and second clamp arms supported by the frame assembly for pivotal movement about respective first and second pivot axes and for axial movement relative to the frame assembly along the longitudinal axis, the first and second clamp arms being connected to the piston. Movement of the projecting end from the extended position to an intermediate position causes pivotal movement of the clamp arms to a clamped position, in which the workpiece is clampingly engaged by the clamp arms. Further movement of the projecting end from the intermediate position to the retracted position causes axial movement of the clamp arms to the clamped and lifted position.

Preferably, the first and second pivot axes are axially moved relative to the frame assembly as the clamp arms are moved from the clamped position to the clamped and lifted position. The clamp preferably further comprises first and second pivot pins respectively defining the first and second pivot axes, and the pivot pins are axially moved relative to the frame assembly as the clamp arms are moved from the clamped position to the clamped and lifted position.

Preferably, the frame assembly defines axially extending first and second tracks, and the first and second pivot pins are respectively supported in the first and second tracks for axial movement along the tracks relative to the frame assembly. The clamp may further comprise first and second slider members respectively supported in the first and second tracks for axial movement along the tracks relative to the frame assembly, and the first and second slide members respectively support the first and second pivot pins so that the pivot pins are axially movable relative to the frame assembly.

The clamp preferably further comprises first and second link pins supported proximate the opposite ends of the first and second clamp arms, respectively, and first and second link members connecting the first and second link pins, respectively, to the projecting end such that movement of the projecting end between the extended position and the retracted position causes movement of the clamp arms between the unclamped position and the clamped and lifted position.

The clamp may further preferably comprise first and second track follower pins supported by the first and second clamp arms, respectively. When the clamp arms are in the unclamped position, the first track follower pin is positioned in a first arcuate track and the second track follower pin is positioned in a second arcuate track. As the clamp arms move from the unclamped position to the clamped position, the first track follower pin moves along the first arcuate track and the second track follower pin moves along the second arcuate track. As the clamp arms move from the clamped position to the clamped and lifted position, the first track follower pin moves along the first track and the second track follower pin moves along the second track, and as the first and second track follower pins move along the first and second tracks, respectively, the clamp arms are prevented from moving to the unclamped position.

Also, as the first track follower pin moves from the first arcuate track to the first track, a portion of the first track follower pin preferably moves into the first cam portion. Similarly, as the second track follower pin moves from the second arcuate track to the second track, a portion of the second track follower pin preferably moves into the second cam portion. When the clamp arms move from the clamped position to the clamped and lifted position, the first and second cam portions are substantially misaligned with the first and second arcuate tracks, respectively, such that the clamp arms are prevented from moving to an unclamped position.

Preferably, the slider members are supported with play in the first and second tracks, respectively, and, when the clamp arms are in the clamped and lifted position, a clamping force applied by the clamp arms causes the first and second slider members to pivot about the first and second link pins, respectively, to become wedged in the first and second track, respectively.

The clamp may further comprise a lift member supported by the projecting end and having a surface engageable with the first and second link members. When the clamp arms are moved to the clamped and lifted position, the surface engages the first and second link members to move the link members to an over-center position.

In addition, the clamp may comprise first and second track followers respectively supported by the first and second link pins, the first track follower being movable along the first arcuate track and the first track, and the second track follower being movable along the second arcuate track and the second track. Also, the clamp may comprise a piston link pin supported by the projecting end and connecting the piston to the first and second link members, and a roller supported by the piston link pin and movable along the center track.

Further, the clamp may comprise first and second workpiece retaining spring assemblies supported in the workpiece engaging end of the first and second clamp arms, respectively.

One advantage of the present invention is that a single mechanism is capable of both clamping a workpiece and then lifting the workpiece from a work surface, reducing the cost and complexity of the mechanism.

Another advantage of the present invention that the first and second clamp arms are moveable between an unclamped position and a clamped and lifted position relative to the frame by a single piston cylinder assembly, rather than having a separate assembly to lift the clamping mechanism. Also, only a single control is required to control both the clamping and the lifting of the workpiece. This also reduces the cost and complexity of the mechanism and the control for the mechanism.

Yet another advantage of the present invention is that, by positioning of the link pins in the axially extending tracks while the clamp arms are moved from the clamped position to the clamped and lifted position, the clamp arms are prevented from moving to the unclamped position as the workpiece is lifted.

A further advantage of the present invention is that, when the workpiece is in the clamped and lifted position, the clamp is mechanically locked in this condition so that a loss of fluid pressure does not result in the workpiece being dropped and/or unclamped.

Other features and advantages of the invention will become apparent to those skilled in the art upon review of the following detailed description, claims and drawings.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 1:
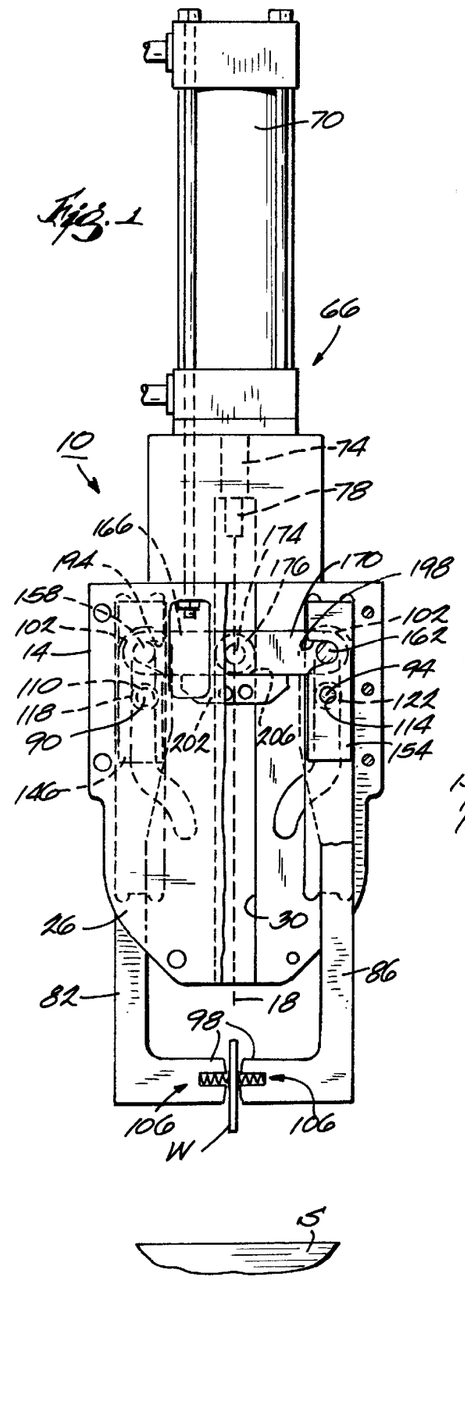
FIG. 1 is a side view of a clamping and lifting mechanism embodying the present invention and illustrating the mechanism in a clamped and lifted condition.

A clamping and lifting mechanism or clamp 10 embodying the invention is illustrated in the Figures. As shown in FIG. 1, the clamp 10 is operable to clamp and lift a workpiece W from a work surface S.

The clamp 10 includes (see FIGS. 1–5) a frame assembly 14 defining a longitudinal axis 18. For purposes of description, in FIGS. 1 and 3–5, "forward" is toward the bottom, and "rearward" is toward the top.

The frame assembly 14 includes (see FIG. 2) first and second body halves 22 and 26. The body halves 22 and 26 are mirror images of each other, and therefore, only the first body half 22 will be described in detail.

Figure 2:
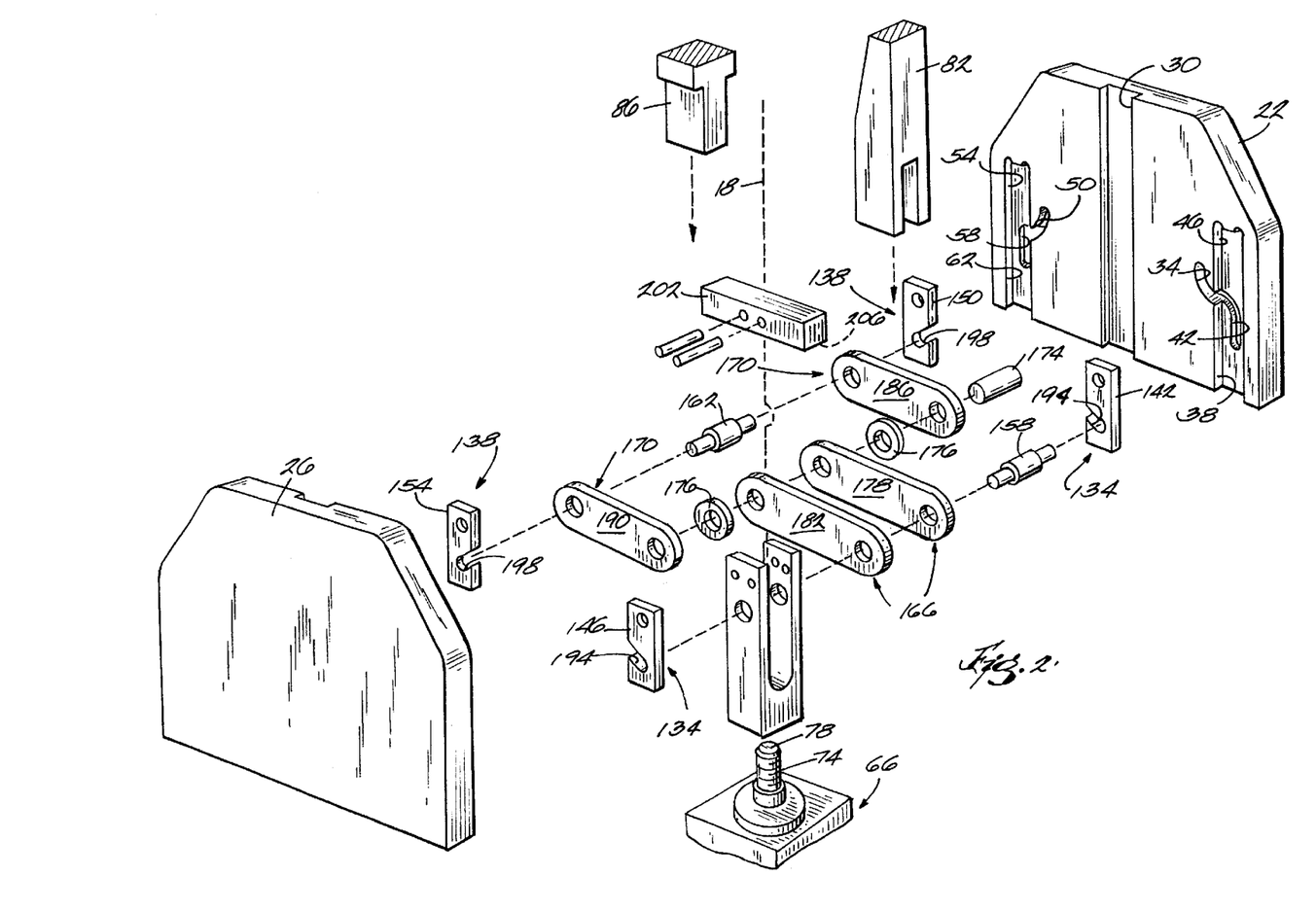
FIG. 2 is an exploded perspective view of the mechanism shown in FIG. 1.

As shown in FIG. 2, the first body half 22 defines an axially-extending center track 30 extending substantially parallel to the longitudinal axis 18. Preferably, the center track 30 defines the axis 18.

The first body half 22 also defines a first arcuate or cam track 34 extending through at least approximately ninety degrees about a first center of curvature. The first body half 22 also defines an axially-extending first track 38 extending substantially parallel to the axis 18 and to the center track 30. The first track 38 has a recessed portion 42 and a raised portion 46. The recessed portion 42 is at the same depth as the first cam track 34, and the rearward portion of the first cam track 34 meets the forward portion of the recessed portion 42 to form a first continuous recessed track.

In addition, the first body half 22 defines a second arcuate or cam track 50 which extends through at least approximately ninety degrees about a second center of curvature. The first body half 22 also defines an axially-extending second track 54 extending substantially parallel to the axis 18, the center track 30 and the first track 38. The second track 54 has a recessed portion 58 and a raised portion 62. The recessed portion 58 is at the same depth as the second cam track 50, and the rearward portion of the second cam track 50 meets the forward portion of the recessed portion 58 to form a second continuous recessed track.

The clamp 10 also includes (see FIGS. 1 and 3–5) an actuating assembly having a movable member movable between an extended position and a retracted position. In the illustrated construction, the actuating assembly is a piston and cylinder assembly 66. The piston and cylinder assembly 66 includes a cylinder 70 and a piston 74. The piston 74 has a projecting end 78, providing the movable member, and extends generally along the axis 18. The projecting end 78 is moveable between a retracted position (shown in FIG. 1), an intermediate position (shown in FIG. 5), and an extended position (shown in FIG. 3). In the illustrated construction, the piston and cylinder assembly 66 is a pneumatic assembly. In other constructions (not shown), the cylinder 70 may provide the movable member. In yet other constructions (not shown), the piston and cylinder assembly 66 may be a hydraulic assembly or a mechanical assembly, such as a screw-type assembly.

The clamp 10 also includes (see FIGS. 1 and 3–5) at least one clamp arm and, preferably, first and second clamp arms 82 and 86 supported by the frame assembly 14. The first and second clamp arms 82 and 86 are supported for pivotal movement about respective first and second pivot axes 90 and 94, and for axial movement relative to the frame assembly 14 and generally parallel to the axis 18. The clamp arms 82 and 86 are operatively connected to the projecting end 78 of the piston 74, as explained below in more detail, so that the clamp arms 82 and 86 are movable between an unclamped position (shown in FIG. 3), a clamped position (shown in FIG. 5), in which the workpiece W is clamped, and a clamped and lifted position (shown in FIG. 1), in which the workpiece W is clamped and lifted from the work surface S.

The clamp arms 82 and 86 each include a workpiece engaging end 98 and an opposite end 102. A spring assembly 106 is supported in each workpiece engaging end 98. The spring assemblies 106 limit the force applied by the clamp arms 82 and 86 to the workpiece W.

First and second pivot bores 110 and 114 are respectively defined in the first and second clamp arms 82 and 86 between the ends 98 and 102. First and second pivot pins 118 and 122 are respectively supported in the first and second pivot bores 110 and 114. The first and second pivot pins 118 and 122 respectively define first and second pivot axes 126 and 130 about which the first and second clamp arms 82 and 86 are pivoted.

Figures 6, 7:
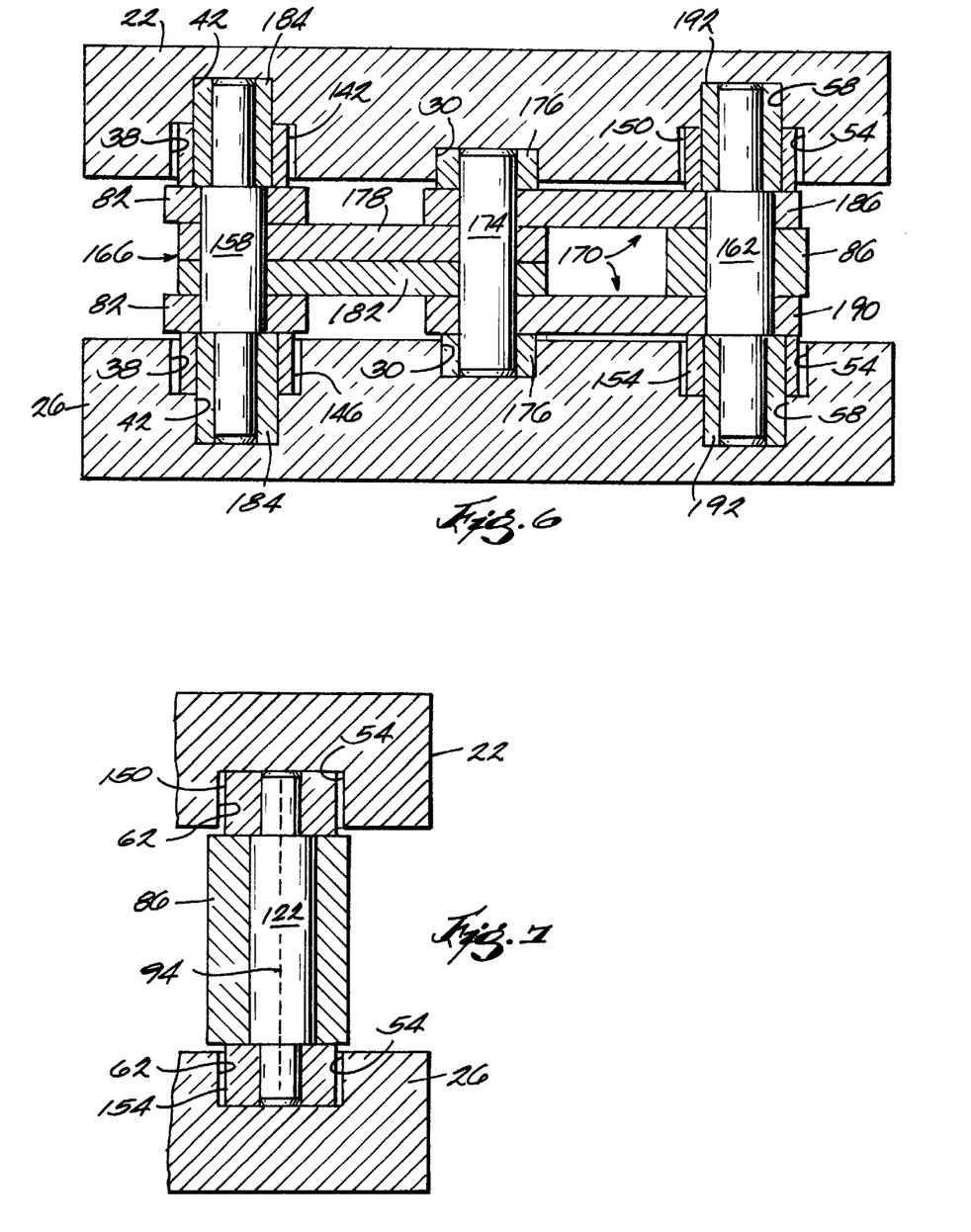
FIG. 6 is a cross-sectional view taken generally along line 6—6 in FIG. 5.
FIG. 7 is a cross-sectional view taken generally along line 7—7 in FIG. 5.

The clamp 10 also includes (see FIG. 2) first and second slider assembly 134 and 138 slidably supported by the frame assembly 14 for movement along the axis 18 in the first and second tracks 38 and 54, respectively. As shown in FIGS. 6 and 7, the slider assemblies 134 and 138 are not tightly fit within the first and second tracks 38 and 54 so that there is some play between the first and second slider assemblies 134 and 138 and the first and second tracks 38 and 54. The purpose for this loose fit is explained below in more detail.

The first slider assembly 134 includes (see FIG. 2) a slider member 142 supported in the first track 38 in the first body half 22 and a slider member 146 supported in the first track 38 in the second body half 26. The opposite ends of the first pivot pin 118 are supported in the slider members 142 and 146 so that the first pivot pin 118 is axially movable relative to the frame assembly 14.

Similarly, the second slider assembly 134 includes a slider member 150 supported in the second track 54 in the first body half 22 and a slider member 154 supported in the second track 54 in the second body half 26. The opposite ends of a the second pivot pin 122 are supported in the slider members 150 and 154 so that the second pivot pin 122 is axially movable relative to the frame assembly 14.

To connect the clamp arms 82 and 86 to the piston 74, the clamp 10 also includes first and second link pins 158 and 162 and first and second link assemblies 166 and 170. The first link pin 158 is supported in the first clamp arm 82 proximate the end 102. The first link assembly 166 is connected between the first link pin 158 and a piston link pin 174 supported on the projecting end 78 of the piston 74 and operatively connects the first clamp arm 82 to the piston 74.

In the illustrated constriction, rollers or track followers 176 are supported on opposite ends of the piston link pin 174. The track followers 176 move in the center track 30 and allow the piston 74 to move more smoothly between the extended and retracted positions.

In the preferred embodiment, the first link assembly 166 includes link members 178 and 182 connected adjacent opposite ends of the first link pin 158. As shown in FIG. 6, the opposite ends of the first link pin 158 extend beyond the link members 178 and 182 and into the first continuous recessed track so that the first link pin 158 also serves as a first track follower pin. A roller or track follower 184 is supported on each opposite end of the first link pin 158 to provide smoother movement along the first continuous recessed track.

As shown in FIG. 2, the second link pin 162 is similarly supported in the second clamp arm 86 proximate the end 102. The second link assembly 170 is connected between the second link pin 162 and the piston link pin 174 and operatively connects the second clamp arm 86 to the piston 74. In the preferred embodiment, the second link assembly 170 includes link members 186 and 190 connected adjacent opposite ends of the second link pin 162. As shown in FIG. 6, the opposite ends of the second link pin 162 extend beyond the link members 186 and 190 and into the second continuous recessed track so that the second link pin 162 also serves as a second track follower pin. A roller or track follower 192 is supported on each opposite end of the second link pin 162 to provide smoother movement along the second continuous recessed track.

As shown in FIG. 2, each slider member 142 and 146 of the first slider assembly 134 defines an arcuate first cam portion 194 to receive a portion of the first link pin 158. In the position illustrated in FIG. 3, the first cam portions 194 are substantially aligned with the first cam track 34 so that the first link pin 158 can move into and out of the first cam portions 194 and the first cam track 34. In the position illustrated in FIG. 1, the first cam portions 194 are substantially misaligned with the first cam track 34 so that the first link pin 158 is prevented from moving from the first cam portions 194 and into the first cam track 34.

As shown in FIG. 2, each slider member 150 and 154 of the second slider assembly 138 similarly defines an arcuate second cam portion 198 to receive a portion of the second link pin 162. In the position illustrated in FIG. 3, the second cam portions 198 are substantially aligned with the second cam track 50 so that the second link pin 162 can move into and out of the second cam portions 198 and the second cam track 50. In the position illustrated in FIG. 1, the second cam portions 198 are substantially misaligned with the second cam track 50 so that the second link pin 162 is prevented from moving from the second cam portions 198 and into the second cam track 50.

In the illustrated construction, the link pins 158 and 162 serve to connect the clamp arms 82 and 86 to the piston 74 and to provide track follower pins. It should be understood, however, that, in other constructions (not shown), separate members or pins could be provided as track follower pins.

These separate pins would respectively engage the first and second arcuate tracks, the first and second tracks, and the first and second cam portions, as described above.

The clamp 10 also includes (see FIGS. 1–5) a lift insert 202 supported on the projecting end 78 of the piston 74. The lift insert 202 has a curved surface 206 which is engageable with the link assemblies 166 and 170. In the position shown in FIG. 1, the surface 206 engages the link assemblies 166 and 170 so that the link assemblies 166 and 170 are moved over-center to a toggled, locking position. As a result, a forward force must be applied to the clamp arms 82 and 86 or the piston 74 must apply a forward force to untoggle or unlock the link assemblies 166 and 170.

Figure 3:
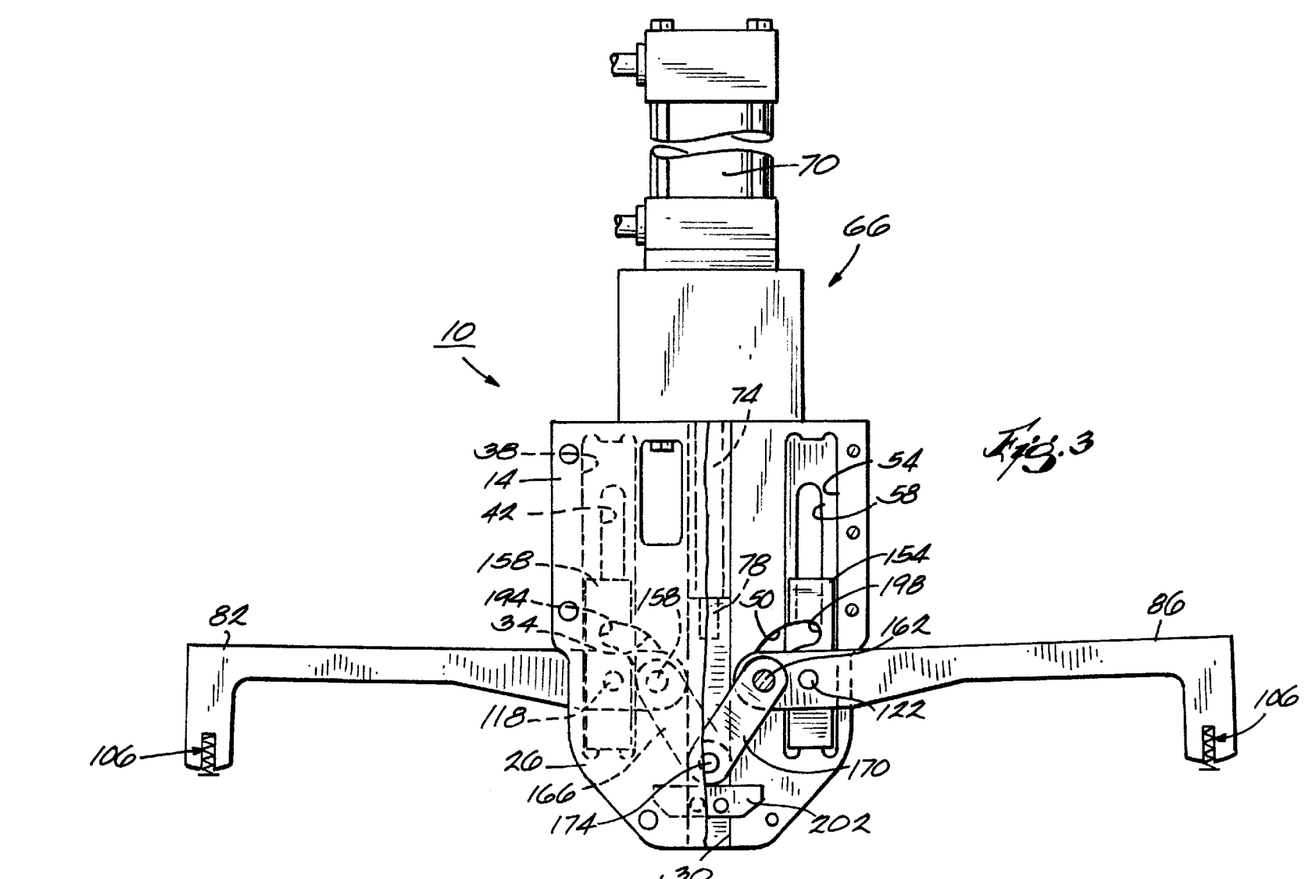
FIG. 3 is a side view of the mechanism shown in FIG. 1 with portions cut away and illustrating the mechanism in an unclamped condition.

In operation, the workpiece W is supported on the work surface S as shown in FIG. 3. The workpiece W or the clamp 10 are moved into position so that the clamp 10 can engage the workpiece W. In the preferred embodiment, the clamp 10 is movably supported on a support frame (not shown) so that the clamp 10 is movable about a work area to different work stations (not shown).

The clamp 10 is positioned in the unclamped condition (shown in FIG. 3). In this position, the piston 74 is in the forward, extended position, and the clamp arms 82 and 86 are thereby moved to the open, unclamped position. The slider assemblies 134 and 138 are in the forward-most position, and the first and second link pins 158 and 162 are in the forward-most portion of the first and second cam tracks 34 and 50, respectively.

Figure 4:
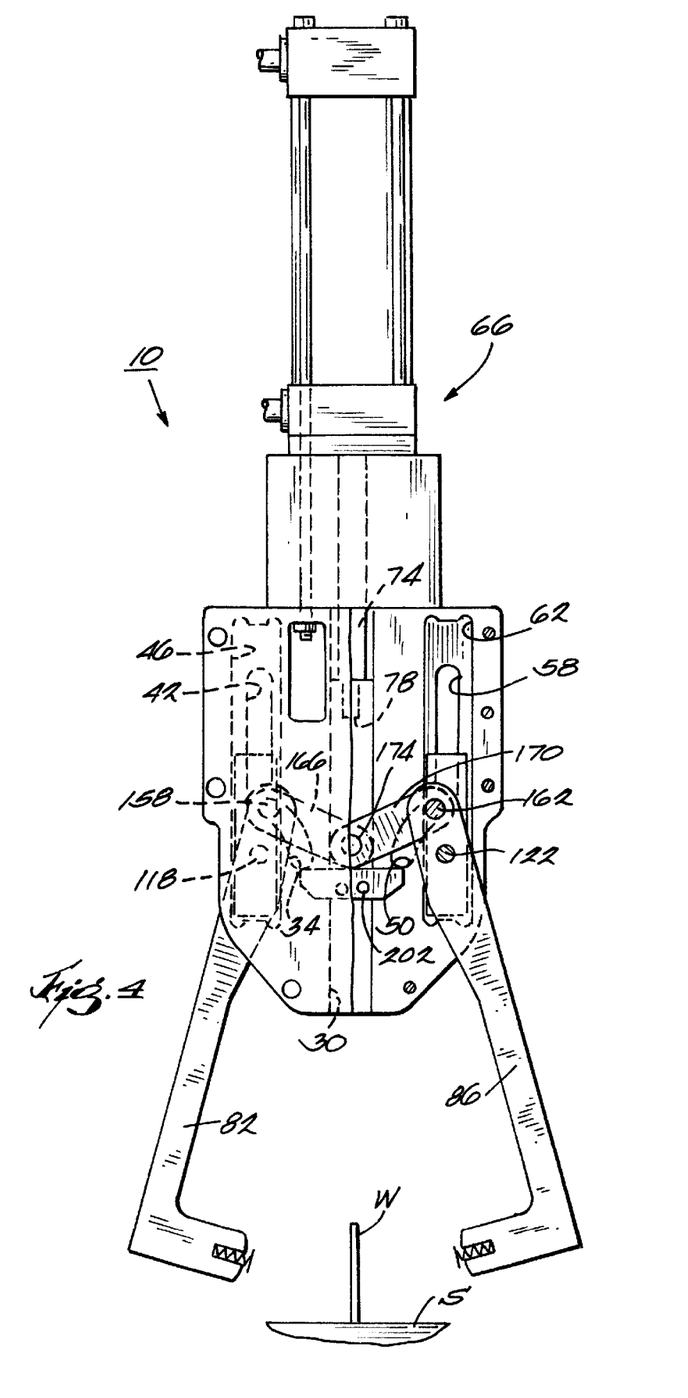
FIG. 4 is a side view of the mechanism shown in FIG. 1 and illustrating the mechanism in a condition between the unclamped condition and a clamped condition.
Figure 5:
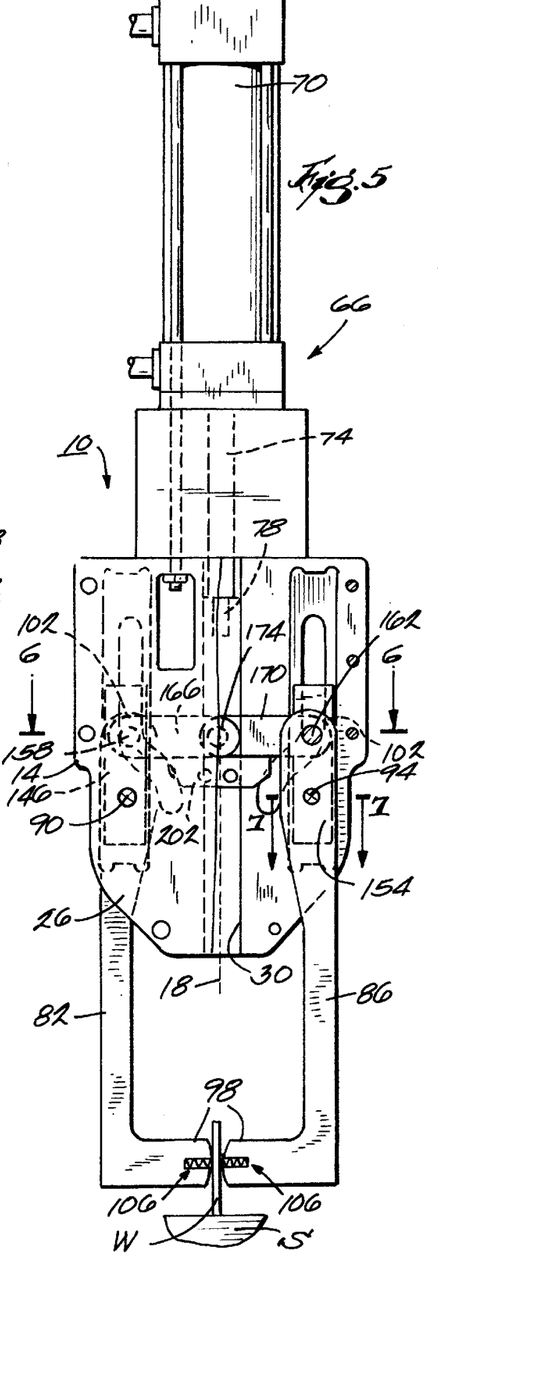
FIG. 5 is a side view of the mechanism shown in FIG. 1 illustrating the mechanism in the clamped condition.

To clamp the workpiece W, the piston 74 is retracted. As shown in FIG. 4, as the piston 74 begins to retract from the extended position, the first and second link pins 158 and 162 move rearwardly along the first and second cam tracks 34 and 50. The first and second link pins 158 and 162 are moved toward the recessed portions 42 and 58 of the first and second tracks 38 and 54 and toward the first and second cam portions 194 and 198 of the first and second slider assemblies 134 and 138. Meanwhile, the slider assemblies 134 and 138 are maintained in the forward-most position.

The piston 74 continues to retract to the intermediate position (shown in FIG. 5) so that the clamp arms 82 and 86 clamp the workpiece W. The spring assemblies 106 engage the workpiece W to limit the clamping force applied to the workpiece W. The clamp 10 is in the clamped condition. In this position, the first and second link pins 158 and 162 have moved into the first and second cam portions 194 and 198 of the first and second slider assemblies 134 and 138. The first and second link pins 158 and 162 have also moved into the recessed portion 42 and 58 of the first and second tracks 38 and 54.

To lift the clamped workpiece W, the piston 74 continues to retract from the intermediate position (shown in FIG. 5) to the retracted position (shown in FIG. 1). In moving to the position shown in FIG. 1, the slider assemblies 134 and 138 are moved axially along the first and second tracks 38 and 54. The first and second cam portions 194 and 198 become misaligned with the first and second cam tracks 34 and 50 so that the first and second link pins 158 and 162 are prevented from moving back into the first and second cam tracks 34 and 50. In this manner, the clamp arms 82 and 86 are prevented from moving to an unclamped position while the workpiece W is in a lifted position (between the positions shown in FIGS. 1 and 5) and in the clamped and lifted position (shown in FIG. 1).

In the clamped and lifted position, the surface 206 of the lift insert 202 engages the link assemblies 166 and 170 to move the link assemblies 166 and 170 into the over-center, toggled and locked position. To move from this locked position, a forward force must be applied to the clamp arms 82 and 86 or to the link assemblies 166 and 170.

Because, as shown in FIGS. 6 and 7, there is play between the slider assemblies 134 and 138 and the first and second tracks 38 and 54, the force applied by the spring assemblies 106 causes the clamp arms 82 and 86 to pivot about the first and second link pins 158 and 162. This pivoting movement causes the slider assemblies 134 and 138 to also pivot about the first and second link pins and to become wedged in the first and second tracks 38 and 54. This "screen door" lock provides a mechanical lock to hold the clamp 10 in the clamped and lifted condition (shown in FIG. 1) even if fluid pressure is lost.

When the workpiece W is in the clamped and lifted condition (shown in FIG. 1), the workpiece W and the clamp 10 may be moved about the work area. The toggled position of the link assemblies 166 and 170 and the "screen door" lock on the slider assemblies 134 and 138 ensures that the clamp 10 is prevented from moving to an unclamped condition while the workpiece W is lifted or to an unlifted condition if fluid pressure is lost.

To release the workpiece W, the process is reversed. The piston 74 is extended from the retracted position until the workpiece W lowered to the work surface S and the clamp 10 is in the clamped condition (shown in FIG. 5). In this position, the slider assemblies 134 and 138 are moved to the forward-most position so that the first and second cam portions 194 and 198 of the slider assemblies 134 and 138 are again substantially aligned with the first and second cam tracks 34 and 50.

As the piston 74 continues to extend, the first and second link pins 158 and 162 move from the first and second cam portions 194 and 198 of the slider assemblies 134 and 138 and into the first and second cam tracks 34 and 50. The clamp arms 82 and 86 are pivoted about the pivot pins 118 and 122 to move to the unclamped position and release the workpiece W. Once the workpiece W is released, the clamp 10 may be moved to clamp and lift another workpiece (not shown) or may again clamp and lift the workpiece W to move the workpiece W to another work station.

It should be understood that the height to which the workpiece W is lifted by the clamp 10 can be adjusted by changing various factors, i.e., the length of the stroke of the piston 74, the length of the first and second tracks 38 and 54, and the length of the clamp arms 82 and 86.

While first and second clamp arms 82 and 86 are shown in the illustrated constriction, it should be understood that the clamp 10 may be used with only a single clamp arm, such as clamp arm 82. If only one clamp arm is provided, only one of each of the components engaging the clamp arm, such as the pivot pin, the link pin, the link assembly, the slider assembly, etc., is required.

Various features of the invention are set forth in the following claims.

What is claimed is:

1. A clamp for clampingly engaging a portion of a workpiece and for lifting the workpiece from a work surface, said clamp comprising:

a frame assembly defining a longitudinal axis;

an actuating assembly supported by said frame assembly and including a movable member movable between a retracted position and an extended position; and a clamp arm supported by said frame assembly for pivotal movement about a pivot axis and for axial movement relative to said frame assembly along said longitudinal axis, said clamp arm being connected to said movable member so that said clamp arm is movable between an unclamped position, in which the workpiece is not clampingly engaged by said clamp arm, and a clamped and lifted position, in which the workpiece is clampingly engaged by said clamp arm and is lifted from the work surface by said clamp arm;

wherein, when said clamp arm is in the unclamped position, movement of said movable member from the extended position to an intermediate position causes pivotal movement of said clamp arm to a clamped position, in which the workpiece is clampingly engaged by said clamp arm;

wherein further movement of said movable member from the intermediate position to the retracted position causes axial movement of said clamp arm to the clamped and lifted position; and wherein said clamp further comprises structure to pivotally restrain said clamp arm as said movable member moves between the intermediate position and the clamped and lifted position.

2. The clamp as set forth in claim 1 wherein said pivot axis is axially movable relative to said frame assembly, and wherein said pivot axis is axially moved relative to said frame assembly as said clamp arm is moved from the clamped position to the clamped and lifted position.

3. The clamp as set forth in claim 1 and further comprising a pivot pin defining said pivot axis, said pivot pin being supported by said frame assembly for axial movement relative to said frame assembly, and wherein said pivot pin is axially moved relative to said frame assembly as said clamp arm is moved from the clamped position to the clamped and lifted position.

4. The clamp as set forth in claim 3 wherein said frame assembly defines an axially extending track, wherein said pivot pin is supported in said track for axial movement along said track relative to said frame assembly.

5. The clamp as set forth in claim 4 and further comprising a slider member supported in said track for axial movement along said track relative to said frame assembly, said slider member supporting said pivot pin so that said pivot pin is axially movable relative to said frame assembly.

6. The clamp as set forth in claim 1 wherein said clamp arm has a workpiece engaging end and an opposite end, and wherein said clamp further comprises:

a link pin supported proximate said opposite end of said clamp arm; and a link member connecting said clamp arm and said link pin to said movable member such that movement of said movable member between the extended position and the retracted position causes movement of said second clamp arm between the unclamped position and the clamped and lifted position.

7. The clamp as set forth in claim 6 and further comprising a lift member supported by said movable member, said lift member having a surface engageable with said link member, and wherein, when said clamp arm is moved to the clamped and lifted position, said surface engages said link member to move said link member to an over-center position.

8. The clamp as set forth in claim 6 wherein said frame assembly defines an axially extending center track, and wherein said clamp further comprises:

a movable member link pin supported by said movable member and connecting said movable member to said link member; and a roller supported by said movable member link pin and movable along said center track.

9. The clamp as set forth in claim 1 wherein said frame defines an axially extending track and an arcuate track, wherein said clamp further comprises a track follower pin supported by said clamp arm, said track follower pin being engageable in said axially extending track and in said arcuate track, wherein, when said clamp arm is in the unclamped position, said track follower pin is positioned in said arcuate track, wherein, as said clamp arm moves from the unclamped position to the clamped position, said track follower pin moves along said arcuate track, and wherein, as said clamp arm moves from the clamped position to the clamped and lifted position, said track follower pin moves along said axially extending track.

10. The clamp as set forth in claim 9 wherein engagement of said track follower pin in said axially extending track prevents said clamp arm from moving to the unclamped position.

11. The clamp as set forth in claim 9 and further comprising a track follower supported by said track follower pin, said track follower being movable along said arcuate track and along said axially extending track.

12. The clamp as set forth in claim 9 and further comprising a slider member supported in said axially extending track for axial movement along said axially extending track relative to said frame assembly, said slider member defining a cam portion, wherein, as said track follower pin moves from said arcuate track to said axially extending track, a portion of said track follower pin moves into said cam portion.

13. The clamp as set forth in claim 12 wherein, when said clamp arm is in the clamped position, said cam portion is substantially aligned with said arcuate track, and wherein, as said clamp arm moves from the clamped position to the clamped and lifted position, said cam portion is substantially misaligned with said arcuate track, such that said clamp arm is prevented from moving to an unclamped position.

14. The clamp as set forth in claim 9 and further comprising a link member connecting said clamp arm and said track follower pin to said movable member such that movement of said movable member between the extended position and the retracted position causes movement of said clamp arm between the unclamped position and the clamped and lifted position.

15. The clamp as set forth in claim 1 wherein said actuating assembly includes a fluid actuated piston and cylinder assembly including a reciprocating piston, said piston having a projecting end providing the movable member and being movable between the retracted position and the extended position.

16. The clamp as set forth in claim 1 and further comprising a second clamp arm supported by said frame assembly for pivotal movement about a second pivot axis and for axial movement relative to said frame assembly along said longitudinal axis, said second clamp arm being connected to said movable member so that said first-mentioned clamp arm and said second clamp arm are movable between the unclamped position, in which the workpiece is not clampingly engaged by said first-mentioned clamp arm and said second clamp arm, and a clamped and lifted position, in which the workpiece is clampingly engaged by said first-mentioned clamp arm and said second clamp arm and is lifted from the work surface by said first-mentioned clamp arm and said second clamp arm.

17. A clamp for clampingly engaging a portion of a workpiece and for lifting the workpiece from a work surface, said clamp comprising:

a frame assembly defining a longitudinal axis;

an actuating assembly supported by said frame assembly and including a movable member movable between a retracted position and an extended position;

first and second clamp arms supported by said frame assembly for pivotal movement about respective first and second pivot axes, said first and second pivot axes being parallel and spaced apart, and for axial movement relative to said frame assembly along said longitudinal axis, said first and second clamp arms being connected to said movable member so that said first and second clamp arms are movable between an unclamped position, in which the workpiece is not clampingly engaged by said first and second clamp arms, and a clamped and lifted position, in which the workpiece is clampingly engaged by said first and second clamp arms and is lifted from the work surface by said first and second clamp arms; and first and second pivot pins respectively defining said first and second pivot axes, said first and second pivot pins being supported by said frame assembly for axial movement relative to said frame assembly;

wherein, when said first and second clamp arms are in the unclamped position, movement of said movable member from the extended position to an intermediate position causes pivotal movement of said first and second clamp arms about said first and second pivot pins, respectively, to a clamped position, in which the workpiece is clampingly engaged by said first and second clamp arms;

wherein, as said first and second clamp arms move from the unclamped position to the clamped position, said first and second pivot pins are substantially stationary relative said frame assembly; and wherein further movement of said movable member from the intermediate position to the retracted position causes axial movement of said first and second clamp arms to the clamped and lifted position and axial movement of said first and second pivot pins relative to said frame assembly.

18. The clamp as set forth in claim 17 wherein said frame assembly defines axially extending first and second tracks, and wherein said clamp further comprises first and second slider members respectively supported in said first and second tracks for axial movement along said first and second tracks relative to said frame assembly, said first and second slider members respectively supporting said first and second pivot pins so that said first and second pivot pins are axially movable relative to said frame assembly.

19. The clamp as set forth in claim 18 wherein said first and second slider members are supported with play in said first and second tracks, respectively, and wherein, when said first and second clamp arms are in the clamped and lifted position, a clamping force applied by said first and second clamp arms causes said first and second slider members to be wedged in said first and second tracks, respectively.

20. The clamp as set forth in claim 18 wherein said frame assembly also defines first and second arcuate tracks, wherein each of said first and second clamp arms have a workpiece engaging end and an opposite end, and wherein said clamp further comprises:

first and second link pins, said first link pin being supported proximate said opposite end of said first clamp arm, said second link pin being supported proximate said opposite end of said second clamp arm; and first and second link members, said first link member connecting said first clamp arm and said first link pin to said movable member and said second link member connecting said second clamp aim and said second link pin to said movable member such that movement of said movable member between the extended position and the retracted position causes movement of said first and second clamp arms between the unclamped position and the clamped and lifted position;

wherein, when said first and second clamp arms are in the unclamped position, said first link pin is positioned in said first arcuate track and said second link pin is positioned in said second arcuate track, wherein, as said first and second clamp arms move from the unclamped position to the clamped position, said first link pin moves along said first arcuate track and said second link pin moves along said second arcuate track, and wherein, as said first and second clamp arms move from the clamped position to the clamped and lifted position, said first link pin moves along said first track and said second link pin moves along said second track.

21. The clamp as set forth in claim 20 wherein, as said first and second link pins move along said first and second tracks, respectively, said first and second clamp arms are prevented from moving to an unclamped position.

22. The clamp as set forth in claim 20 wherein said first and second slider members respectively define first and second cam portions, wherein, as said first link pin moves from said first arcuate track to said first track, a portion of said first link pin moves into said first cam portion, wherein, as said second link pin moves from said second arcuate track to said second track, a portion of said second link pin moves into said second cam portion, wherein, when said first and second clamp arms are in the clamped position, said first and second cam portions are substantially aligned with said first and second arcuate tracks, respectively, and wherein, as said first and second clamp arms move from the clamped position to the clamped and lifted position, said first and second cam portions are substantially misaligned with said first and second arcuate tracks, respectively, such that said first and second clamp aims are prevented from moving to an unclamped position.

23. A clamp for clampingly engaging a portion of a workpiece and for lifting the workpiece from a work surface, said clamp comprising:

a frame assembly having a longitudinal axis and defining axially extending first and second tracks and first and second arcuate tracks, said first track communicating with said first arcuate track and said second track communicating with said second arcuate track;

a fluid actuated piston and cylinder assembly supported by said frame assembly and including a reciprocating piston having a projecting end movable between a retracted position and an extended position;

first and second clamp arms supported by said frame assembly for pivotal movement about respective first and second pivot axes and axial movement parallel to said longitudinal axis between an unclamped position and a clamped and lifted position, each of said first and second clamp arms having a workpiece engaging end and an opposite end;

first and second pivot pins respectively defining said first and second pivot axes and supported by said frame assembly for axial movement along said longitudinal axis;

first and second slider members respectively supported in said first and second tracks for axial movement relative to said frame assembly, said first and second slider members respectively supporting said first and second pivot pins for axial movement along said first and second tracks relative to said frame assembly, said first and second slider members defining respective first and second arcuate cam portions;

first and second link pins, said first link pin being supported proximate said opposite end of said first clamp arm and being movable along said first arcuate track and said first track, said second link pin being supported proximate said opposite end of said second clamp arm and being movable along said second arcuate track and said second track;

first and second link members, said first link member connecting said first link pin and said projecting end, said second link member connecting said second link pin and said projecting end such that movement of said projecting end between said extended position and said retracted position causes movement of said first and second clamp arms between the unclamped position and the clamped and lifted position;

wherein, when said first and second clamp aims are in the unclamped position, said first and second cam portions defined by said first and second slider members are substantially aligned with said first and second arcuate tracks, respectively;

wherein, as said projecting end is moved from the extended position to an intermediate position, said first and second clamp arms are pivoted to a clamped position and said first and second link pins move along said first and second arcuate tracks, respectively, and into said first and second tracks, respectively, a portion of said first link pin moving into said first cam portion of said first slider member and a portion of said second link pin moving into said second cam portion of said second slider member; and wherein, as said projecting end is moved from the intermediate position to the retracted position, said first and second clamp arms are moved to the clamped and lifted position and the first and second slider members are moved in said first and second tracks, respectively, so that said first and second arcuate portions are substantially misaligned with said first and second arcuate tracks to prevent said first and second clamp arms from moving to an unclamped position.

24. The clamp as set forth in claim 23 and further comprising first and second workpiece retaining spring assemblies supported in said workpiece engaging end of said first and second clamp arms, respectively.

25. The clamp as set forth in claim 23 and further comprising first and second track followers respectively supported by said first and second link pins, wherein said first track follower is movable along said first arcuate track and said first track, and wherein said second track follower is movable along said second arcuate track and said second track.

26. The clamp as set forth in claim 23 and further comprising a lift member supported by said projecting end, said lift member having a surface engageable with said first and second link members, and wherein, when said first and second clamp arms are moved to the clamped and lifted position, said surface engages said first and second link members to move said first and second link members to an over-center position.

27. The clamp as set forth in claim 23 wherein said first and second clamp members are supported with play in said first and second tracks, respectively, and wherein, when said first and second clamp arms are in said clamped and lifted position, a clamping force applied by said first and second clamp arms causes said first and second slider members to pivot about said first and second link pins, respectively, to become wedged in said first and second track, respectively.

28. The clamp as set forth in claim 1 wherein said frame assembly defines an axially extending track, wherein said clamp further comprises a slider member supported in said axially extending track for axial movement along said axially extending track relative to said frame assembly, said slider member supporting said pivot pin so that said pivot pin is axially movable relative to said frame assembly, said slider member being supported with play in said axially extending track, and wherein, when said clamp arm is in the clamped and lifted position, a clamping force applied by said clamp arm causes said slider member to be wedged in said axially extending track.

29. A clamp for clampingly engaging a portion of a workpiece and for lifting the workpiece from a work surface, said clamp comprising:

a frame assembly defining a longitudinal axis;

an actuating assembly supported by said frame assembly and including a movable member movable between a retracted position and an extended position; and a clamp arm supported by said frame assembly for pivotal movement about a pivot axis and for axial movement relative to said frame assembly along said longitudinal axis, said clamp arm being connected to said movable member so that said clamp arm is movable between an unclamped position, in which the workpiece is not clampingly engaged by said clamp arm, and a clamped and lifted position, in which the workpiece is clampingly engaged by said clamp arm and is lifted from the work surface by said clamp arm;

wherein, when said clamp arm is in the unclamped position, movement of said movable member from the extended position to an intermediate position causes pivotal movement of said clamp arm to a clamped position, in which the workpiece is clampingly engaged by said clamp arm;

wherein further movement of said movable member from the intermediate position to the retracted position causes axial movement of said clamp arm to the clamped and lifted position;

wherein said frame assembly defines an axially extending track and an arcuate track, wherein said clamp further comprises a track follower pin supported by said clamp arm, said track follower pin being engageable in said axially extending track and said arcuate track, wherein, when said clamp arm is in the unclamped position, said follower pin is positioned in said arcuate track, wherein, as said clamp arm moves from the unclamped position to the clamped position, said track follower pin moves along said arcuate track, wherein, as said clamp arm moves from the clamped position to the clamped and lifted position, said track follower pin moves along said axially extending track;

wherein said clamp further comprises a slider member supported in said axially extending track for axial movement along said axially extending track relative to said frame assembly, said slider member defining a cam portion, and wherein, as said track follower pin moves from said arcuate track to said axially extending track, a portion of said track follower pin moves into said cam portion.

30. The clamp as set forth in claim 29 wherein, when said clamp arm is in the clamped position, said cam portion is substantially aligned with said arcuate track, and wherein, as said clamp arm moves from the clamped position to the clamped and lifted position, said cam portion is substantially misaligned with said arcuate track, such that said clamp arm is prevented from moving to an unclamped position.

31. A clamp for clampingly engaging a portion of a workpiece and for lifting the workpiece from a work surface, said clamp comprising:

a frame assembly defining a longitudinal axis;

an actuating assembly supported by said frame assembly and including a movable member movable between a retracted position and an extended position;

first and second clamp arms supported by said frame assembly for pivotal movement about respective first and second pivot axes and for axial movement relative to said frame assembly along said longitudinal axis, said first and second clamp arms being connected to said movable member so that said first and second clamp arms are movable between an unclamped position, in which the workpiece is not clampingly engaged by said first and second clamp arms, and a clamped and lifted position, in which the workpiece is clampingly engaged by said first and second clamp arms and is lifted from the work surface by said first and second clamp arms; and first and second pivot pins respectively defining said first and second pivot axes, said first and second pivot pins being supported by said frame assembly for axial movement relative to said frame assembly;

wherein, when said first and second clamp arms are in the unclamped position, movement of said movable member from the extended position to an intermediate position causes pivotal movement of said first and second clamp arms about said first and second pivot pins, respectively, to a clamped position, in which the workpiece is clampingly engaged by said first and second clamp arms;

wherein, as said first and second clamp arms move from the unclamped position to the clamped position, said first and second pivot pins are substantially stationary relative said frame assembly; and wherein further movement of said movable member from the intermediate position to the retracted position causes axial movement of said first and second clamp arms to the clamped and lifted position and axial movement of said first and second pivot pins relative to said frame assembly;

wherein said frame assembly defines axially extending first and second tracks, and wherein said clamp further comprises first and second slider members respectively supported in said first and second tracks for axial movement along said first and second tracks relative to said frame assembly, said first and second slider members respectively supporting said first and second pivot pins so that said first and second pivot pins are axially movable relative to said frame assembly;

wherein said frame assembly also defines first and second arcuate tracks, wherein each of said first and second clamp arms have a workpiece engaging end and an opposite end, and wherein said clamp further comprises:

first and second link pins, said first link pin being supported proximate said opposite end of said first clamp arm, said second link pin being supported proximate said opposite end of said second clamp arm; and first and second link members, said first link member connecting said first clamp arm and said first link pin to said movable member and said second link member connecting said second clamp arm and said second link pin to said movable member such that movement of said movable member between the extended position and the retracted position causes movement of said first and second clamp arms between the unclamped position and the clamped and lifted position;

wherein, when said first and second clamp arms are in the undamped position, said first link pin is positioned in said first arcuate track and said second link pin is positioned in said second arcuate track, wherein, as said first and second clamp arms move from the unclamped position to the clamped position, said first link pin moves along said first arcuate track and said second link pin moves along said second arcuate track, and wherein, as said first and second clamp arms move from the clamped position to the clamped and lifted position, said first link pin moves along said first track and said second link pin moves along said second track;

wherein said first and second slider members respectively define first and second cam portions, wherein, as said first link pin moves from said first arcuate track to said first track, a portion of said first link pin moves into said first cam portion, wherein, as said second link pin moves from said second arcuate track to said second track, a portion of said second link pin moves into said second cam portion, wherein, when said first and second clamp arms are in the clamped position, said first and second cam portions are substantially aligned with said first and second arcuate tracks, respectively, and wherein, as said first and second clamp arms move from the clamped position to the clamped and lifted position, said first and second cam portions are substantially misaligned with said first and second arcuate tracks, respectively, such that said first and second clamp arms are prevented from moving to an unclamped position.

* * * * *